United States Patent [19]

Shimaoka et al.

[11] Patent Number: 5,795,995
[45] Date of Patent: Aug. 18, 1998

[54] LEAK TESTER AND LEAK TESTING METHOD

[75] Inventors: Kiyoshige Shimaoka; Mauri Ukonmaanaho, both of Kyoto, Japan

[73] Assignee: Mitsubishi Jidosha Kogyo Kabushiki Kaisha, Tokyo, Japan

[21] Appl. No.: 821,857

[22] Filed: Mar. 21, 1997

[30] Foreign Application Priority Data

Mar. 22, 1996 [JP] Japan ................. 8-066855

[51] Int. Cl.⁶ .......................................... G01M 3/26
[52] U.S. Cl. ...................................... 73/40; 73/49.2
[58] Field of Search ............................ 73/40, 49.2

[56] References Cited

U.S. PATENT DOCUMENTS

| | | | |
|---|---|---|---|
| 4,686,851 | 8/1987 | Holm et al. | 73/49.2 |
| 4,811,252 | 3/1989 | Furuse | 364/556 |
| 5,081,864 | 1/1992 | Zaim | 73/49.2 |
| 5,120,129 | 6/1992 | Farquharson et al. | 356/246 |
| 5,146,902 | 9/1992 | Cook et al. | 123/518 |
| 5,347,848 | 9/1994 | Schoeffel et al. | 73/37 |
| 5,367,797 | 11/1994 | Zaim | 73/49.2 |
| 5,412,978 | 5/1995 | Boone et al. | 73/49.2 |
| 5,546,789 | 8/1996 | Balke et al. | 73/40 |
| 5,600,996 | 2/1997 | Witschi | 73/49.2 |
| 5,624,551 | 4/1997 | Baumann et al. | 210/134 |

FOREIGN PATENT DOCUMENTS

| | | |
|---|---|---|
| 749286A | 2/1995 | Japan. |
| 792052A | 4/1995 | Japan. |

*Primary Examiner*—Hezron E. Williams
*Assistant Examiner*—J. David Wiggins

[57] ABSTRACT

This invention relates to a leak tester for testing the tightness of a test object such as a fuel feed apparatus for an internal combustion engine, and specifically to a leak tester for testing the air tightness of a fuel feed apparatus provided with a first opening and a second opening and having a space portion between the first and second openings. The leak tester is provided with a master (reference chamber) having substantially the same internal volume as the fuel feed apparatus, a pneumatic pressure source for supplying air of a predetermined pressure to the test object through the first opening and also to the master, a differential pressure leak tester for measuring a pressure difference between a pressure of the fluid within the test object and that within the master, and a flow meter for measuring a flow rate of air flowing out of the fuel feed apparatus through the second opening; and the leak tester detects leakage of air from the test object other than that through the second opening on a basis of the pressure difference and the flow rate.

16 Claims, 2 Drawing Sheets

LEAK TESTER AND LEAK TESTING METHOD

BACKGROUND OF THE INVENTION a) Field of the Invention

This invention relates to a leak tester and leak testing method for testing the gas tightness of an object to be tested (hereinafter called a "test object" for the sake of brevity) such as a fuel feed apparatus in an internal combustion engine, and especially to a leak tester and leak testing method suitable for use with a test object containing a leak portion within itself or an object having a portion which is not equipped with sufficient pressure resistance.

b) Description of the Related Art

Leak tests have conventionally be conducted on fuel feed apparatuses of internal combustion engines to confirm whether or not they are provided with sufficient gas tightness (or liquid tightness).

Such a leak test is generally conducted by mounting an injector and the like on a cylinder head, that is, on a fuel feed apparatus in an assembled state. A fuel feed apparatus in an assembled state will hereinafter be called a "work".

A leak test is usually conducted using a leak tester such as that to be described next. Specifically, a leak tester is provided with a hollow container having the same volume as the work and formed in a hermetic structure (hereinafter called a "master" as per a reference chamber), a pressure source (air tank) for feeding a fluid of the same pressure (for example, an air pressure) to these work and master, and a differential pressure leak tester for measuring an internal pressure difference between the master and the work.

When the air pressure is fed to the work and the master at the same time, a pressure difference arises between the master and the work if there is any leakage of air from the work. This pressure difference is detected by the differential pressure leak tester. This makes it possible to confirm the air tightness of the above-mentioned fuel feed apparatus.

Where the work contains a space within itself and internal leakage of air takes place due to the space, no accurate confirmation is feasible with respect to air tightness because the internal leakage affects the above-mentioned pressure difference. Taking a fuel feed apparatus as an example, this will be described next in detail.

In recent years, direct fuel injection internal combustion engines or in-cylinder injection internal combustion engines, in which fuel is injected directly into cylinders as in diesel engines, have also been proposed in internal combustion engines which primarily use gasoline as fuel (hereinafter called "gasoline engines").

Such an in-cylinder injection internal combustion engine has made it possible to substantially change the fuel injection timing in accordance with the state of operation of the engine, thereby allowing to reduce exhaust gas while improving the performance of the engine.

A high fuel injection pressure is however required upon injecting fuel, for example, in compression strokes. Further, an engine equipped with a supercharger requires a high fuel injection pressure during supercharging because of the existence of a supercharged pressure.

A fuel feed apparatus in an in-cylinder injection internal combustion engine is therefore designed to feed fuel to a fuel injection valve after further pressurizing the fuel, which has been pressurized by a low-pressure fuel pump in a fuel tank, by a high-pressure fuel pump so that a sufficiently high fuel injection pressure (for example, several tens atm or so) can be obtained.

As the high-pressure fuel pump, a pump of the engine-driven type (hereinafter called the "engine-driven pump") is used. As a corollary to this, it operates in direct association with operation of the engine and produces a delivery flow rate corresponding to a revolution speed of the engine. The delivery pressure is adjusted to a predetermined pressure by a regulator.

In the fuel feed apparatus, a fuel line is provided with a check valve to prevent a reverse flow of the fuel fed out from the high-pressure fuel pump.

On such a fuel feed apparatus in an in-cylinder injection internal combustion engine, it may be contemplated to conduct a leak test in a similar manner as the above-mentioned leak test as illustrated in FIG. 2.

Namely, a leak test is conducted as will be described next. Injectors 6 and a regulator 21 are attached to a delivery pipe 6A and further, a work (test object) 1 with a high-pressure fuel pump 8 incorporated therein is connected together with a master 2 to a pneumatic pressure source 3. Air, which has been pressurized by the pneumatic pressure source 3, is fed to the work 1 and the master 2 at the same time. Occurrence of any leakage is detected by a differential pressure leak tester 4. In this case, the regulator 21 is closed on a downstream side while the injectors 6 are closed at free ends thereof, so that the pressurized air is prevented from leaking.

It is necessary to conduct the leak test under a high pressure because in the in-cylinder injection internal combustion engine, the pressure of fuel in the fuel feed apparatus becomes high.

The high-pressure fuel pump 8, which is arranged in the fuel feed apparatus of such an in-cylinder injection internal combustion engine as mentioned above, can pressurize fuel into a high-pressure state when driven by the engine. The fuel pump may however be damaged at an oil seal or the like when a working fluid of high pressure acts on the pump from an outside of the pump (especially, from an upstream side of the pump).

Described specifically, when a working fluid of a pressure equivalent to a delivery pressure of the high-pressure fuel pump 8 is applied from the upstream side of the pump 8, the high pressure is applied even to a portion which is not exposed to such a high pressure during ordinary use. Such a portion is not provided with sufficient pressure resistance because it is usually not exposed to a high pressure. When a high pressure is applied from the upstream side of the high-pressure fuel pump as in usual leak tests, the high-pressure fuel pump 8 may be damaged.

To avoid such a problem, it may also be contemplated to conduct a leak test by connecting the pneumatic pressure source 3 to a fuel line on the downstream side of the regulator 21 and feeding pressurized air in a direction opposite to the feeding direction of the fuel.

Since the fuel line on the downstream side of the high-pressure fuel pump 8 is provided with a check valve a to prevent a reverse flow of fuel as mentioned above, feeding of pressurized air from the downstream side of the high-pressure fuel pump 8 should eliminate the potential problem of a damage to the high-pressure fuel pump 8.

However the above-mentioned check valve is generally composed of a steel ball (check ball) and a steel seat, so that leakage may take place in a direction opposite to the feeding direction of fuel in some instances although such leakage is not much.

To detect leakage from the fuel feed apparatus to the outside (which will hereinafter be called "outward leakage), it must therefore be necessary to ascertain such leakage, which takes place at the check valve or the like only during the test (hereinafter be "internal leakage"), and to take it into consideration.

All the same, the above-mentioned leak test cannot ascertain such internal leakage, resulting in the problem that the existence or non-existence of outward leakage from the fuel feed apparatus cannot be determined accurately.

Incidentally, Japanese Patent Application Laid-Open (Kokai) No. HEI 7-49286 discloses a technique which relates to a leak testing method of an engine. According to this technique, a net quantity of leaked air is determined by subtracting a quantity of blowby air from a quantity of leaked air, the last-mentioned quantity including the quantity of blowby air. Internal leakage such as that mentioned above is however not taken into consideration so that the existence or non-existence of outward leakage cannot be precisely detected insofar as there is internal leakage.

Further, Japanese Patent Application Laid-Open (Kokai) No. HEI 7-92052 discloses a technique which is concerned with a gas-tightness testing method for a hollow container. According to this technique, a pressure difference between the hollow container and a reference tank is detected, the pressure difference is corrected to measure a reduction in internal pressure due to leakage from a fuel tank, and based on the reduction in internal pressure, the existence or non-existence of leakage from the fuel tank is determined. As mentioned above, it is also impossible to precisely determine the existence or non-existence of outward leakage insofar as there is internal leakage. This technique is also unable to resolve the above-mentioned problem.

SUMMARY OF THE INVENTION

With the foregoing problem in view, the present invention has as an object the provision of a leak tester and a leak testing method, which make it possible to precisely detect the existence or non-existence of outward leakage from an apparatus even when the apparatus has internal leakage.

Accordingly, the present invention provides a leak tester for testing the tightness of a test object provided with a first and second openings and having a space portion between the first and second openings, characterized in that the leak tester comprises:

a master having substantially the same internal volume as the test object, a pressure source for supplying a fluid of a predetermined pressure to the test object and the master, said pressure source supplying the fluid to the test object through the first opening, a first measuring instrument for measuring a pressure difference between a pressure of the fluid within the test object and that within the master, and a second measuring instrument for measuring a flow rate of the fluid flowing out of the test object through the second opening;

and that the leak tester detects leakage of the fluid from the test object other than that through the second opening on a basis of the pressure difference and the flow rate.

This makes it possible to exclude internal leakage of the test object from apparent outward leakage of the test object (namely, the leakage from the second opening of the test object), thereby bringing about an advantage that the outward leakage of the test object can be accurately detected. There is another advantage, that is, a leak test can still be conducted with all parts of the test object assembled together even if the test object has possibility of developing internal leakage during its test.

The test object may include a cut-off member for cutting off communication in at least a direction from the first opening to the second opening, and the second measuring instrument may detect a flow rate of the fluid leaked from the cut-off member.

This makes it possible to exclude the flow rate of the fluid leaked from the cut-off member included in the test object, thereby bringing about an advantage that the outward leakage of the test object can be accurately detected.

The test object may include a high-pressure zone on a side of the first opening relative to the cut-off member and a low-pressure zone on a side of the second opening relative to the cut-off member, an allowable pressure for the high-pressure zone may be set higher than that for the low-pressure zone, and the predetermined pressure may be set higher than the allowable pressure for the low-pressure zone.

This has an advantage that, even when a test object includes a low-pressure zone having no sufficient allowable pressure, this zone can be isolated from a high pressure to avoid its breakage or the like. Further, even when a test object is one that is used under a high pressure, a pressure equal to or higher than the high pressure can be applied, thereby bringing about another advantage that a leak test can be conducted accurately.

The test object may be a fuel feed apparatus for use in an internal combustion engine for an automotive vehicle; and the fuel feed apparatus may comprise:

a fuel pump for feeding out fuel while pressurizing the same, a fuel line for feeding the fuel, which has been pressurized by the fuel pump, to a fuel injector, a check valve arranged between the fuel pump and the fuel injector for preventing a reverse flow of the fuel fed out from the fuel pump, and a fuel return line for returning surplus fuel in the fuel injector to a fuel tank;

and wherein the pressure source is connected to the fuel return line via the first opening to feed the fluid from a downstream side of the fuel feed apparatus toward an upstream side of the fuel feed apparatus, and the second measuring instrument is connected to an upstream side of the fuel pump via the second opening to measure the flow rate of the fluid flowing out to the upstream side of the fuel pump.

This has an advantage that an accurate leak test can be conducted on the fuel feed apparatus employed in the internal combustion engine for the automotive vehicle.

An allowable pressure for a side of the fuel injector relative to the fuel pump may be set higher than that for the upstream side of the fuel pump; and the predetermined pressure is set higher than the allowable pressure for the upstream side of the fuel pump.

This has an advantage that, even in the case of a fuel feed apparatus equipped with a fuel pump including a low-pressure zone having no sufficient allowable pressure, this zone can be isolated from a high pressure to avoid its breakage or the like and an accurate leak test can be conducted.

The fuel injector may be a high-pressure fuel injection valve for directly injecting fuel into a combustion chamber of the internal combustion engine.

This has an advantage that an accurate leak test can be conducted without damaging a high-pressure fuel pump which is particularly important in an internal combustion engine of the direct fuel injection type.

Further, the fluid may preferably be air. This has advantages that the detection ability of leakage can be enhanced and that the cost can be reduced.

The present invention also provides a leak testing method for testing the tightness of a test object provided with a first opening and a second opening and having a space portion between the first and second openings, the method comprises the following steps:

feeding a fluid of a predetermined pressure to the test object through the first opening, feeding the fluid of the predetermined pressure to a master, said master having substantially the same internal volume as the test object, measuring a pressure difference between a pressure of the fluid within the test object and that within the master, and measuring a flow rate of the fluid flowing out of the test object through the second opening;

and the method detects leakage of the fluid from the test object other than that through the second opening on a basis of the pressure difference and the flow rate.

This makes it possible to exclude internal leakage of the test object from apparent outward leakage of the test object (namely, the leakage from the second opening of the test object), thereby bringing about an advantage that the outward leakage of the test object can be accurately detected. There is another advantage, that is, a leak test can still be conducted with all parts of the test object assembled together even if the test object has possibility of developing internal leakage during its test.

The test object may include a cut-off member for cutting off communication in at least a direction from the first opening to the second opening, and the flow rate measuring step may detect a flow rate of the fluid leaked from the cut-off member.

This makes it possible to exclude the flow rate of the fluid leaked from the cut-off member included in the test object, thereby bringing about an advantage that the outward leakage of the test object can be accurately detected.

The test object may include a high-pressure zone on a side of the first opening relative to the cut-off member and a low-pressure zone on a side of the second opening relative to the cut-off member, an allowable pressure for the high-pressure zone may be set higher than that for the low pressure zone, and the predetermined pressure is set higher than the allowable pressure for the low-pressure zone.

This has an advantage that, even when a test object includes a low-pressure zone having no sufficient allowable pressure, this zone can be isolated from a high pressure to avoid its breakage or the like. Further, even when a test object is one that is used under a high pressure, a pressure equal to or higher than the high pressure can be applied, thereby bringing about another advantage that a leak test can be conducted accurately.

The test object may be a fuel feed apparatus for use in an internal combustion engine for an automotive vehicle; and the fuel feed apparatus may comprise:

a fuel pump for pressurizing fuel, a fuel line for feeding the fuel, which has been pressurized by the fuel pump, to a fuel injector, a check valve arranged between the fuel pump and the fuel injector for preventing a reverse flow of the fuel fed out from the fuel pump, and a fuel return line for returning surplus fuel in the fuel injector to a fuel tank;

and wherein the fluid feeding step is to feed the fluid from a downstream side of the fuel feed apparatus toward an upstream side of the fuel feed apparatus, and the flow rate measuring step is to measure the flow rate of the fluid flowing out toward the upstream side of the fuel pump.

This has an advantage that an accurate leak test can be conducted on the fuel feed apparatus employed in the internal combustion engine for the automotive vehicle.

An allowable pressure for a side of the fuel injector relative to the fuel pump may be set higher than that for the upstream side of the fuel pump; and the predetermined pressure may be set higher than the allowable pressure for the upstream side of the fuel pump.

This has an advantage that, even when a test object includes a low-pressure zone having no sufficient allowable pressure, this zone can be isolated from a high pressure to avoid its breakage or the like. Further, even when a test object is one that is used under a high pressure, a pressure equal to or higher than the high pressure can be applied, thereby bringing about another advantage that a leak test can be conducted accurately.

The fuel injector may be a high-pressure fuel injection valve for directly injecting fuel into a combustion chamber of the internal combustion engine.

This has an advantage that an accurate leak test can be conducted without damaging a high-pressure fuel pump which is particularly important in an internal combustion engine of the direct fuel injection type.

Further, the fluid may preferably be air. This has advantages that the detection ability of leakage can be enhanced and that the cost can be reduced.

DETAILED DESCRIPTION OF THE PREFERRED EMBODIMENT

Figure 1:
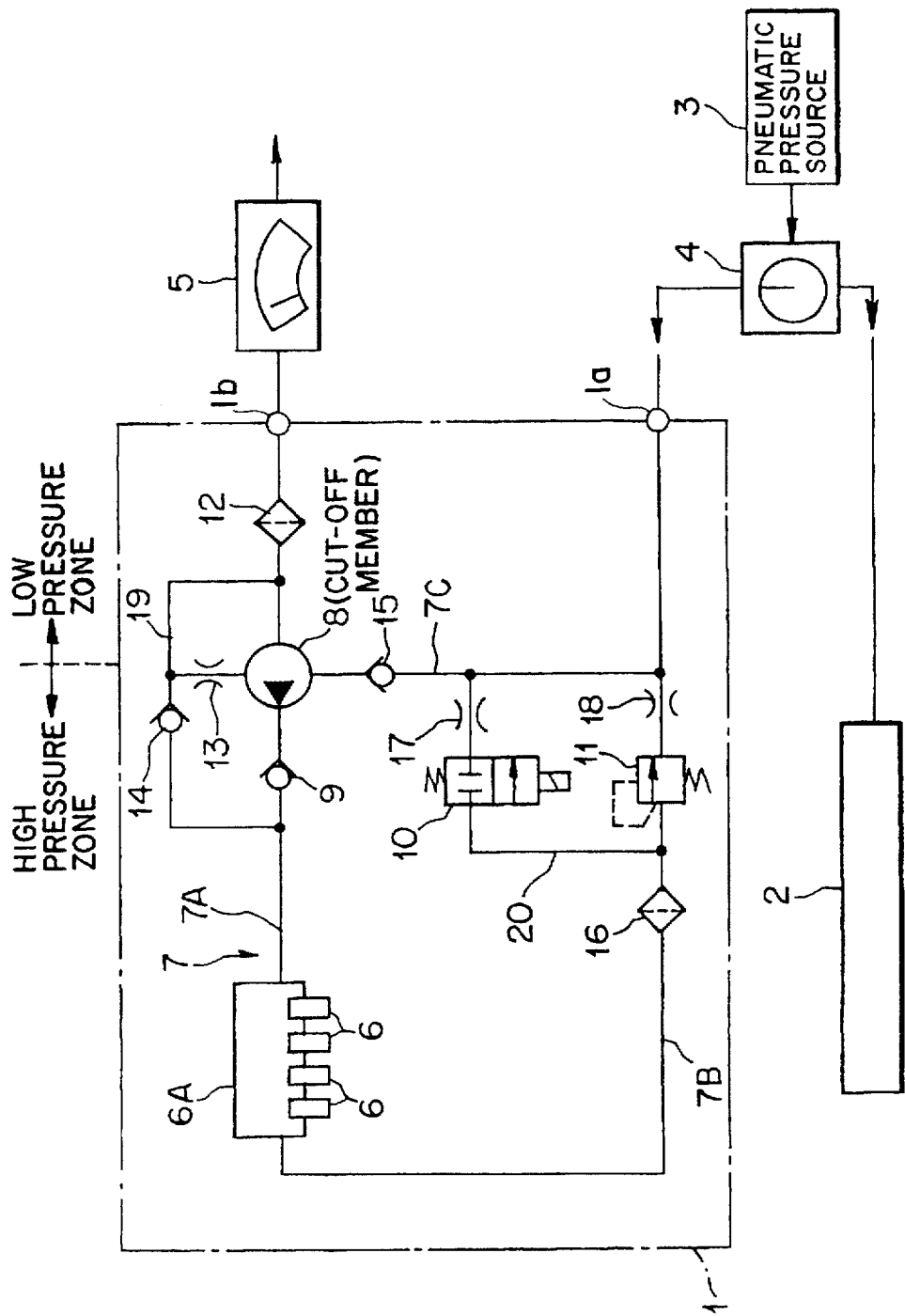
FIG. 1 is a schematic circuit diagram showing a leak tester according to one embodiment of the present invention.
Figure 2:
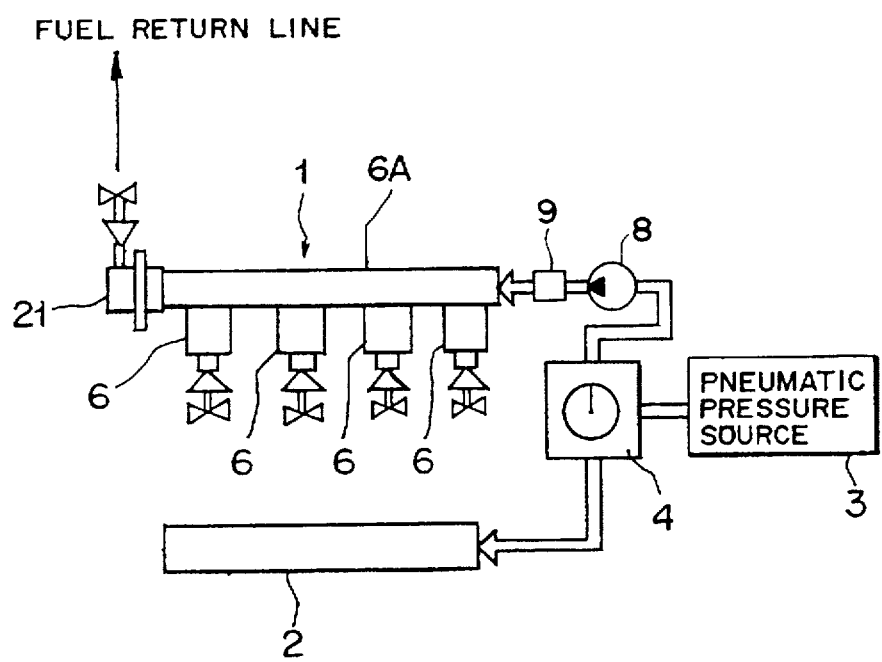
FIG. 2 is a schematic diagram useful for explaining a problem which would arise if a leak test of an in-cylinder injection internal combustion engine were conducted using a general leak tester.

With reference to FIG. 1, a description will be made about the one preferred embodiment of the present invention.

FIG. 1 illustrates a fuel feed apparatus 1 as a work (i.e., a test object), a master 2, a pneumatic pressure source 3 as a pressure source, a differential pressure leak tester 4 as a first measuring instrument, a flow meter 5 as a second measuring instrument, a high-pressure fuel injection valve (hereinafter called the "injector") 6 as a fuel injector, a fuel line 7, a high-pressure fuel pump (fuel pump) 8 arranged in an upstream portion of the fuel line 7 and also acting as a cut-off member, check valves 9,14,15, a solenoid-controlled directional control valve 10 as a solenoid valve, a high-pressure regulator 11, fuel filters 12,16, and orifices 13,17, 18.

A description will first be made about the fuel feed apparatus 1 as a work in the leak tester according to the preferred embodiment of the present invention. It is to be noted that in the subsequent description, an "upstream side" and a "downstream side" mean an "upstream side" and a "downstream side" in a usual form of use of the fuel feed apparatus 1, respectively.

The fuel feed apparatus (test object) 1 is arranged in a direct fuel injection internal combustion engine (in-cylinder injection internal combustion engine) in which fuel is injected directly into cylinders (combustion chambers). A fuel line 7 is disposed, communicating the injectors 6 and a fuel tank (not illustrated) with each other. This fuel line 7 is composed of a fuel feed line 7A, which is adapted to feed fuel from the fuel tank to the injectors 6, and a fuel return line 7B for returning any surplus fuel, which has not been injected through the injectors 6, to the fuel tank. Further, the fuel feed line 7A is provided with the high-pressure fuel pump 8. To the injectors 6, fuel is fed through a delivery pipe 6A. The delivery pipe 6A itself will be considered as a part of the fuel line 7 herein.

The injectors 6 are computer-controlled in operation so that fuel can be injected in a desired quantity and at a desired timing in accordance with the engine speed, the inducted air quantity, etc.

The high-pressure fuel pump 8 serves to pressurize fuel, which has been delivered from a low-pressure fuel pump (not shown), to several tens atm or so and subsequent to filtration through a fuel filter 12, to feed the fuel toward the delivery pipe 6A. As a consequence, the pressure of the fuel on an upstream side of the high-pressure fuel pump 8 is pressurized, for example, to 50 atm or so.

As the high-pressure pump 8, an engine-driven pump more advantageous in-pump efficiency and cost than an auxiliary motor-driven pump, for example, a reciprocating compressor is used. It operates in, a directly interlocked fashion with the engine to produce, a delivery rate corresponding to a revolution speed of the engine.

As will be described in detail subsequently herein, the high-pressure fuel pump 8 can also be regarded as a cut-off member because it cuts off the communication through the fuel line 7 in a direction from the downstream side to the upstream side. To the high-pressure fuel pump 8 as the cut-off member, a low pressure applies in its upstream-side zone (i.e., on a side of a second opening 1b) and a high pressure applies in its downstream-side zone (i.e., on a side of a first opening 1a). The upstream-side zone will be called a "low-pressure zone", whereas the downstream-side zone will be called a "high-pressure zone". An allowable pressure for the high-pressure zone is set so that it becomes higher than an allowable pressure for the low-pressure zone.

Further, the check-valve 9 is arranged in the fuel feed line 7A on a downstream side of the high-pressure fuel pump 8 so that any reverse flow of the fuel fed out from the high-pressure fuel pump 8 can be prevented. Incidentally, this check valve 9 is composed of a steel ball and a steel seat.

On a downstream side of the injectors 6, that is, in the fuel return line 7B of the fuel line 7, the high-pressure regulator 11 is arranged. This high-pressure regulator 11 remains closed until the delivery pressure of the high-pressure fuel pump 8 exceeds a preset value. When the delivery pressure exceeds the preset value, a portion of the fuel, said portion being in an amount corresponding to the extra pressure, is returned toward the fuel tank so that the fuel pressure in the injectors 6 is stabilized at a predetermined level. Here, the above-mentioned preset value is set, for example, at 5 MPa (namely, about 50 atm) or so in view of combustion stability and gas mileage. In addition, the orifice 18 is arranged on a downstream side of the high-pressure regulator 11.

On the other hand, a bypass line 19 is arranged connecting the upstream side and the downstream side of the high-pressure fuel pump 8 so that the fuel can be fed to the injectors 6 while bypassing the high-pressure fuel pump 8.

This bypass line 19 is provided with the check valve 14, which allows the fuel to pass through the fuel feed line 7A only from the upstream side to the downstream side. This check valve 19 opens the bypass line 19 when the high-pressure fuel pump is not operated fully and the fuel pressure is hence lower on the downstream side of the high-pressure fuel pump 8 than on its upstream side. In contrast, the check valve 19 keeps the bypass line 19 closed while the high-pressure fuel pump 8 is operated fully and the fuel pressure thus remains higher on the downstream side of the high-pressure fuel pump 8 than on its upstream side.

Since the above-described check valves 9, 14 have similar function as the high-pressure fuel pump 8 in that they cut off the communication from the downstream side to the upstream side of the fuel line and also in that a low pressure applies in the upstream-side zone and a high pressure applies in the downstream-side zone, they may also be regarded as "cut-off members" like the high-pressure, fuel pump 8. In another embodiment of the present invention in which the check valve 9 is arranged on the upstream side of the high-pressure fuel pump 8, a low pressure applies in the upstream-side zone relative to the high-pressure fuel pump 8 (i.e., on the side of the second opening) and a low pressure applies in the downstream-side zone relative to the check valve 9 (i.e., on the side of the first opening).

Incidentally, a further restrictor (i.e., the orifice 13) is also arranged between the bypass line 19 and the high-pressure fuel pump 8.

To make it possible to discharge the fuel from the injectors 6 toward the fuel tank by bypassing the high-pressure regulator 11, another bypass line 20 is arranged connecting the upstream side of the high-pressure regulator 11 and the restrictor 18 with their downstream side. This bypass line 20 is provided with the solenoid-controlled directional control valve 10 which regulates the delivery pressure from the high-pressure fuel pump 8 to a preset value. Immediately downstream the solenoid-controlled directional control valve 10, the orifice 17 is arranged.

Between the high-pressure fuel pump 8 and the bypass line 20, a fuel drain line 7C is arranged to drain the fuel from a drain compartment within the high-pressure fuel pump 8 to the outside. This fuel drain line 7C is provided with the check valve 15 so that no high pressure is applied to the high-pressure fuel pump 8 upon testing the gas tightness. Incidentally, the check valve 15 is constructed similarly to the check valve 9.

The fuel filter 16 is disposed in the fuel return line 7B on the upstream side of the bypass line 20 and the high-pressure regulator 11.

The solenoid-controlled directional control valve, 10 is controlled in operation by a controller (not shown). When operated as a result of energization, the control valve 10 opens the bypass line 20. It keeps the bypass line 20 closed while it remains unenergized, that is, non-operated. The controller performs control in such a way that the solenoid-controlled directional control valve 10 is opened upon start-up of the engine and is kept closed while the engine remains in a normal operation state (i.e., after the start-up).

This is to discharge any fuel which was still remaining on the downstream side of the delivery pipe 6A at the time of the stopping of the engine in the preceding engine operation. Namely, when moving from an operation state of the engine to a stopped state of the engine, fuel of high temperature and high pressure remains within the delivery pipe 6A and the fuel return line 7B. If fuel remains at such high temperature and high pressure as described above, vapor (bubbles) is formed in the fuel so that upon starting up the engine next time, the pressures inside the delivery pipe 6A and the fuel return line 7B fail to rise promptly, resulting in deteriorated start-up performance. Accordingly, the solenoid-controlled directional control valve 10 is arranged in the bypass line 20 and is opened upon start-up.

Next, the master 2, the pneumatic pressure source 3, the differential pressure leak tester 4 and the flow meter 5 in the leak tester according to the one embodiment of the present invention will be described successively.

The master 2 has the same internal volume as the fuel feed apparatus 1 as a work and, in view of a measurement error due to its thermal conductivity, is formed of the same material as the fuel feed apparatus 1 (i.e., an aluminum alloy in this embodiment).

The pneumatic pressure source 3 is a high-pressure pumping apparatus for pressurizing air (fluid) to a high pressure, and is designed to enable to feed air of the same pressure (a predetermined pressure) to the fuel feed apparatus 1 and the master 2. For example, the pneumatic pressure source 3 is designed to permit feeding of pressurized air which is equivalent to a pressure (for example, 50–60 atm) applied to the downstream side of the high-pressure fuel pump 8 during normal operation of the fuel feed apparatus 1. Incidentally, the pressure (predetermined pressure) of air fed from the pneumatic pressure source 3 is set higher than the allowable pressure for the low-pressure zone of the high-pressure fuel pump 8 as the cut-off member.

Further, the pneumatic pressure source 3 is connected through the below-described differential pressure leak tester 4 to an open portion of the fuel return line 7B in the fuel feed apparatus 1 (namely, the first opening) and also to the master 2.

The differential pressure leak tester (the first measuring instrument) 4 is to measure a pressure difference between an air pressure (fluid pressure) fed to the fuel feed apparatus 1 and an air pressure fed to the master 2, both from the pneumatic pressure source 3, that is, a difference in pressure (pressure difference) caused by outward leakage and internal leakage. In this embodiment, the pressure difference detected by the differential pressure leak tester 4 is converted into a flow rate. Incidentally, the term "outward leakage" means leakage from the fuel feed apparatus 1 to the outside while the term "internal leakage" means leakage within the fuel feed apparatus 1. As such internal leakage, leakage through the check valves 9,14 in the fuel feed apparatus 1 can be thought of, for example.

Namely, the above-mentioned check valves 9,14 are both arranged to prevent a reverse flow of fuel. Since fuel pressures higher than the preset pressure of the high-pressure regulator are not applied to these check valves 9,14, they are constructed to successfully prevent a reverse flow of fuel at pressures below this preset pressure. When a working fluid of a pressure higher than the preset pressure of the high-pressure regulator 11 (pressurized air in this embodiment) is fed to the fuel line 7 from the downstream side of the high-pressure fuel pump 8 during a leak test, the working fluid is expected to leak to some extent to the upstream sides of the check valves 9,14. Moreover, these check valves 9,14 are not of such a type as strictly inhibiting leakage of fuel to the upstream side because they are each composed of a steel ball and a steel seat as mentioned above.

On the other hand, the flow meter (the second measuring instrument) 5 is to measure the quantity of the fluid leaked within the fuel feed apparatus 1, that is, the quantity of the fluid leaked through the high-pressure fuel pump 8 as the cut-off member.

This flow meter 5 is connected to an open portion (the second opening) on the upstream side of the high-pressure fuel pump 8, namely, in the fuel feed line 7A of the fuel feed apparatus 1, and the fuel feed line 7A is open into the atmosphere on the upstream side of the high-pressure fuel pump 8. Namely, the check valves 9,14,15 are arranged in the fuel feed line 7A at the position immediately downstream the high-pressure fuel pump 8, the bypass line 19 and the fuel discharge line 7C, respectively, so that there is a limitation to a flow of the highly-pressurized air toward the high-pressure fuel pump 8. As mentioned above, it is however impossible to completely avoid leakage of the highly-pressurized air because of the structures of the check valves 9,14. To protect the high-pressure fuel pump 8 from a damage by this air leakage, the air is released into the atmosphere on the upstream side of the fuel feed line 7A.

The high-pressure fuel pump 8 itself is arranged to pressurize the low-pressure fuel to a high pressure on the upstream side and then to deliver the thus-pressurized fuel to the downstream side. Application of a working fluid of high pressure from the outside is however considered to result in damages of unillustrated seal portions, because no high pressure is applied to the high-pressure fuel pump 8 from the outside and the high-pressure fuel pump 8 itself is hence not required to have excessively high pressure resistance. The high-pressure fuel pump 8 is therefore not provided at a portion thereof (for example, a seal portion on the upstream side), where no high pressure is applied during normal use of the high-pressure fuel pump 8, with any pressure resistance sufficient for leak tests. A high-pressure fluid cannot therefore be applied.

Therefore, the upstream side of the high-pressure fuel pump 8 is open into the atmosphere, so that the quantity of air internally leaked through the check valves 9,14,15 is detected by the flow meter 5 while protecting the high-pressure fuel pump 8.

As the leak tester according to the preferred embodiment of the present invention is constructed as described above, a leak test can be carried out in a manner such as that to be described subsequently herein.

Upon conducting a leak test for the inspection of the gas tightness of the fuel feed apparatus 1, high-pressure air, which has been pressurized to a pressure (predetermined pressure) substantially equal to a pressure applied to the downstream side of the high-pressure fuel pump 8 during normal operation of the fuel feed apparatus 1, is fed to the fuel feed apparatus (test object) 1 from the side of the fuel return line 7B (namely, the first opening) by the pneumatic pressure source 3, and high-pressure air (fluid) pressurized to the same pressure is also fed to the master 2 through the differential pressure leak tester (the first measuring instrument by the pneumatic pressure source 3.

Next, a difference in pressure (pressure difference) between the air pressure fed to the fuel feed apparatus 1 and that fed to the master 2, both by the pneumatic pressure source 3, is detected. In this case, occurrence of neither internal leakage nor outward leakage leads to a balanced state in internal pressure between the fuel feed apparatus 1 and the master 2 so that no pressure difference arises. If leakage (outward leakage or internal leakage) has taken place, on the other hand, a pressure drop has occurred on the side of the fuel feed apparatus 1, resulting in the development of a pressure difference between the internal pressure of the fuel feed apparatus 1 and that of the master 2.

The quantity of air which is discharged into the atmosphere through the flow meter 5, in other words, the quantity of air subjected to the internal leakage (low-pressure side leakage) is detected by the flow meter 5. When the quantity of air discharged into the atmosphere through the second opening of the fuel line 7, in other words, the internal leakage, is 0, the pressure difference detected in the above-described step is considered to be attributable to the outward leakage alone.

Next, based on a pressure difference obtained as detection results in each detection conducted as mentioned above, the existence or non-existence of leakage into the outside of the fuel feed apparatus 1 (high-pressure-side leakage) is determined. As a consequence, the difference between the quantity of air determined based on the pressure difference and the quantity of air discharged into the atmosphere (internal leakage) is the external leakage. When the difference between the quantity of air determined based on the pressure difference and the quantity of air discharged into the atmosphere (the internal leakage) is 0, no outward leakage is considered to have occurred.

Accordingly, the leak test can be conducted with all the parts or components of the fuel feed apparatus assembled together, leading to the advantage that the leak test is easy. No high pressure can be applied to the high-pressure fuel pump 8 from an upstream side because of its structure. A leak test can however be conducted on the high-pressure fuel pump 8 while maintaining it in an open state on its upstream side. This has the advantage that the leak test can be conducted without damaging any portion of the high-pressure fuel pump 8, said portion being insufficient in pressure resistance, by applying a pressure equal to or higher than the fuel pressure during normal use of the fuel feed apparatus 1. In addition, the use of a pneumatic pressure in the leak test also has an advantage that the leak tester has high leakage detecting ability.

In the leak tester according to this embodiment of the present invention, the work is used as the fuel feed apparatus. Besides, this tester can also be used widely for those (works) requiring inspections with respect to their tightness, and is of high utility value especially for those requiring application of high pressures.

Pneumatic pressure is used as fluid pressure in the leak tester according to this embodiment of the present invention. Fluid pressure is however not limited to pneumatic pressure and another fluid pressure, for example, hydraulic pressure or the like can also be used.

What is claimed is:

1. A leak tester for testing the tightness and outward leakage of a test object provided with first and second openings and having an internal volume between said first and second openings, where no fluid is allowed to flow from said first opening to said second opening for the case of the non-leaking test object, comprising:
    a master having substantially the same internal volume as said test object;
    a pressure source for supplying a fluid of a predetermined pressure to said test object and said master, said pressure source supplying said fluid to said test object through said first opening;
    a first measuring instrument for measuring a pressure difference between a pressure of said fluid within said test object and that within said master; and
    a second measuring instrument for measuring a flow rate of said fluid flowing out of said test object only through said second opening to detect an internal leakage inside the test object,
    wherein said leak tester detects outward leakage of said fluid from said test object other than that internal leakage through said second opening on a basis of said measured pressure difference and said measured flow rate.

2. The leak tester according to claim 1, wherein said test object includes a cut-off member for cutting off communication in at least a direction from said first opening to said second opening, and said second measuring instrument detects a flow rate of said fluid leaked from said cut-off member.

3. The leak tester according to claim 2, wherein said test object includes a high-pressure zone on a side of said first opening relative to said cut-off member and a low-pressure zone on a side of said second opening relative to said cut-off member, an allowable pressure for said high-pressure zone is set higher than that for said low-pressure zone, and said predetermined pressure is set higher than said allowable pressure for said low-pressure zone.

4. The leak tester according to claim 1, wherein said test object is a fuel feed apparatus for use in an internal combustion engine for an automotive vehicle, wherein said fuel feed apparatus includes,
    a fuel pump for feeding out fuel while pressurizing the same,
    a fuel line for feeding said fuel pressurized by said fuel pump, to a fuel injector,
    a check valve arranged between said fuel pump and said fuel injector for preventing a reverse flow of said fuel fed out from said fuel pump, and
    a fuel return line for returning surplus fuel in said fuel injector to a fuel tank,
    and wherein said pressure source is connected to said fuel return line via said first opening to feed said fluid from a downstream side of said fuel feed apparatus toward an upstream side of said fuel feed apparatus, and said second measuring instrument is connected to an upstream side of said fuel pump via said second opening to measure said flow rate of said fluid flowing out to said upstream side of said fuel pump.

5. The leak tester according to claim 4, wherein an allowable pressure for a side of said fuel injector relative to said fuel pump is set higher than that for the upstream side of said fuel pump; and said predetermined pressure is set higher than said allowable pressure for said upstream side of said fuel pump.

6. The leak tester according to claim 4, wherein said fuel injector is a high-pressure fuel injection valve for directly injecting fuel into a combustion chamber of said internal combustion engine.

7. The leak tester according to claim 1, wherein said fluid is air.

8. A leak testing method for testing the tightness and outward leakage of a test object provided with a first opening and a second opening and having an internal volume between said first and second openings, where no fluid is allowed to flow from said first opening to said second opening for the case of the non-leaking test object, comprising:
    feeding a fluid of a predetermined pressure to said test object through said first opening;
    feeding said fluid of said predetermined pressure to a master, said master having substantially the same internal volume as said test object;
    measuring a pressure difference between a pressure of said fluid within said test object and that within said master; and
    measuring a flow rate of said fluid flowing out of said test object only through said second opening to detect an internal leakage inside the test object, wherein said method detects an outward leakage of said fluid from said test object other than that internal leakage through said second opening on a basis of said measured pressure difference and said measured flow rate.

9. The leak testing method according to claim 8, wherein said test object includes a cut-off member for cutting off communication in at least a direction from said first opening to said second opening, and said flow rate measuring step detects a flow rate of said fluid leaked from said cut-off member.

10. The leak testing method according to claim 9, wherein said test object includes a high-pressure zone on a side of said first opening relative to said cut-off member and a low-pressure zone on a side of said second opening relative to said cut-off member, an allowable pressure for said high-pressure zone is set higher than that for said low pressure-zone, and said predetermined pressure is set higher than said allowable pressure for said low-pressure zone.

11. The leak testing method according to claim 8, wherein said test object is a fuel feed apparatus for use in an internal combustion engine for an automotive vehicle; and said fuel feed apparatus includes, a fuel pump for pressurizing fuel, a fuel line for feeding said fuel, which has been pressurized by said fuel pump, to a fuel injector, a check valve arranged between said fuel pump and said fuel injector for preventing a reverse flow of said fuel fed out from said fuel pump, and a fuel return line for returning surplus fuel in said fuel injector to a fuel tank, and wherein said fluid feeding step is to feed said fluid from a downstream side of said fuel feed apparatus toward an upstream side of said fuel feed apparatus, and said flow rate measuring step is to measure said flow rate of said fluid flowing out toward said upstream side of said fuel pump.

12. The leak testing method according to claim 11, wherein an allowable pressure for a side of said fuel injector relative to said fuel pump is set higher than that for the upstream side of said fuel pump, and said predetermined pressure is set higher than said allowable pressure for said upstream side of said fuel pump.

13. The leak testing method according to claim 11, wherein said fuel injector is a high-pressure fuel injection valve for directly injecting fuel into a combustion chamber of said internal combustion engine.

14. The leak testing method according to claim 8, wherein said fluid is air.

15. A leak tester for detecting outward leakage other than an internal leakage of a test object having a first opening, a second opening, and a first internal volume provided between the first and second openings, the first internal volume having at least one restrictor therein which restricts a fluid flow from the first opening to the second opening, where no fluid is allowed to flow from said first opening to said second opening for the case of the non-leaking test object, comprising:

a master having a second internal volume;

a pressure source which provides pressurized fluid to the test object through the first opening and to said master;

a first measuring unit which measures a difference between a pressure inside the test object at an upstream side of the restrictor and a pressure inside said master; and a second measuring unit which measures an amount of said fluid leaking through the restrictor, wherein the leak tester detects the outward leakage through the restrictor based on said measured pressure difference and said measured fluid amount.

16. A leak tester of claim 15, wherein the capacity of said second internal volume is substantially the same as the capacity of the first internal volume.

* * * * *